March 7, 1967    G. B. MUNSEY    3,307,475
COOKING APPLIANCE
Filed Sept. 3, 1965    3 Sheets-Sheet 1
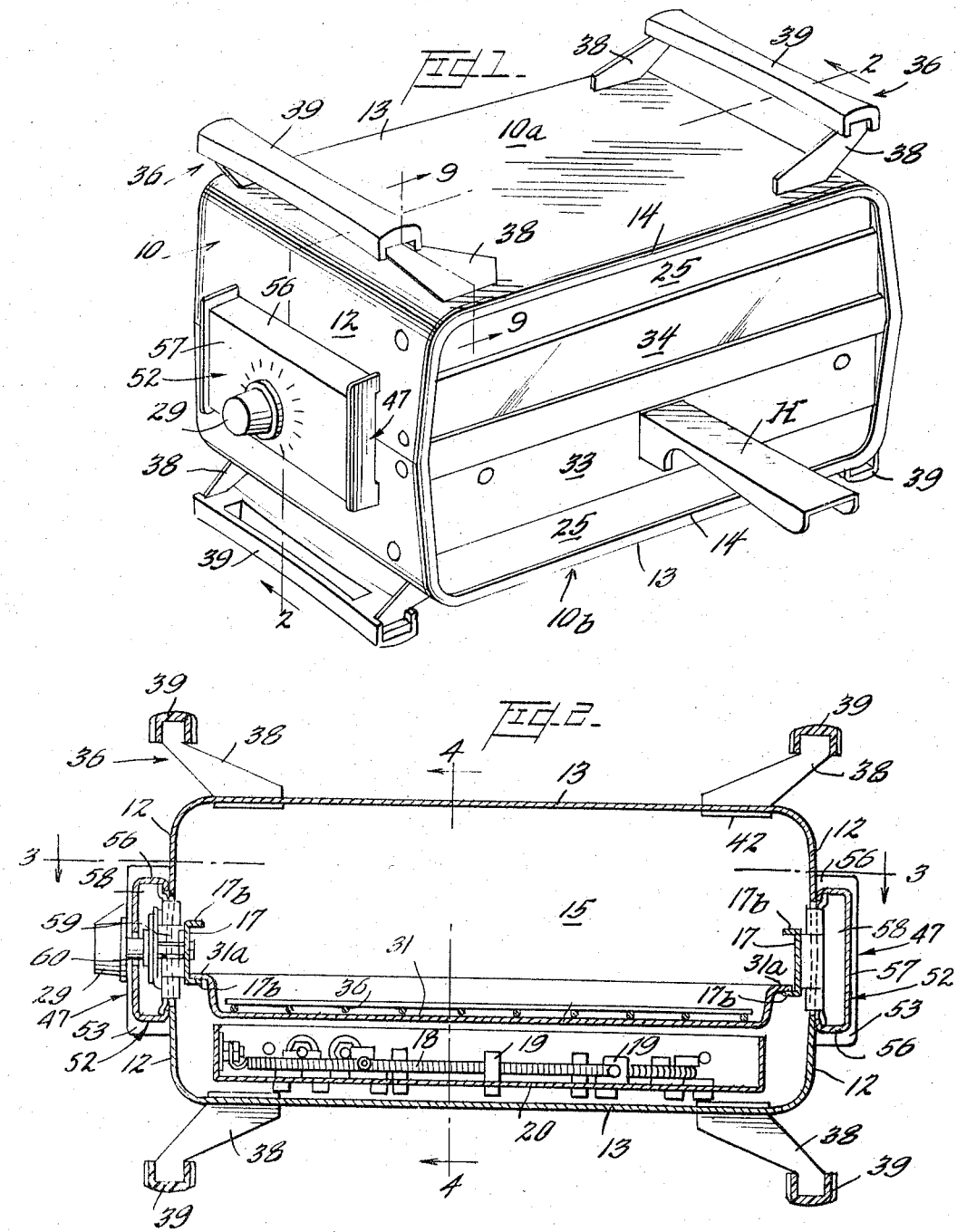
INVENTOR
George B. Munsey,
BY
ATTORNEYS

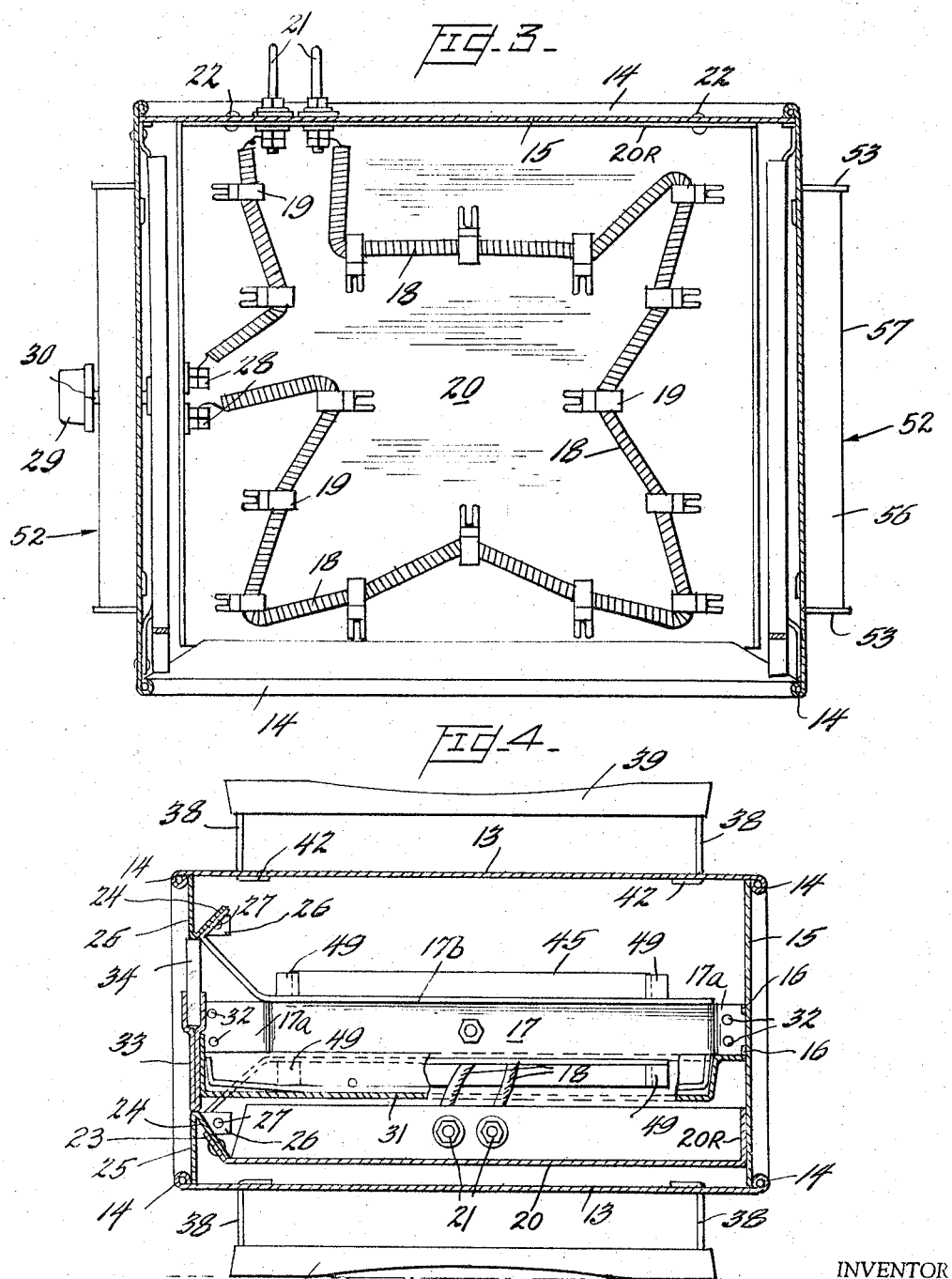

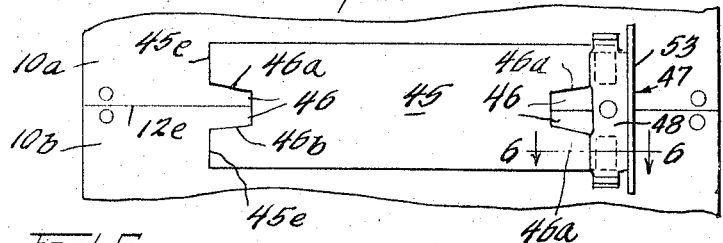
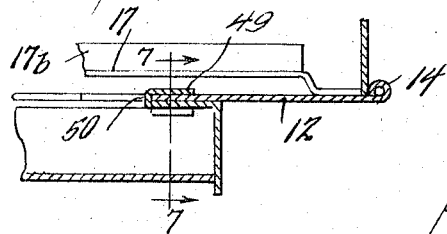
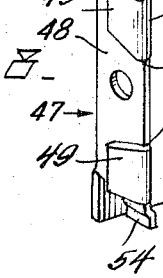
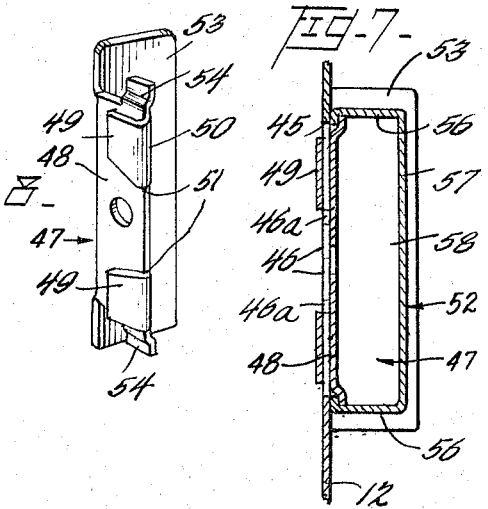
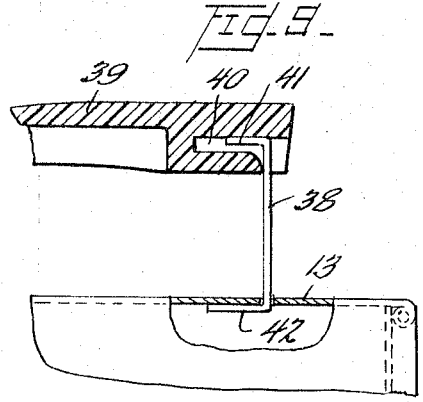
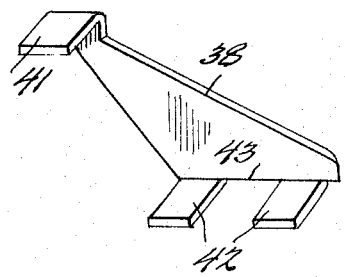
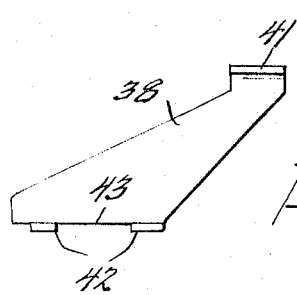

United States Patent Office 3,307,475
Patented Mar. 7, 1967

3,307,475
COOKING APPLIANCE
George B. Munsey, Little Rock, Ark., assignor to Munsey Products Inc., Little Rock, Ark., a corporation of Arkansas
Filed Sept. 3, 1965, Ser. No. 484,823
16 Claims. (Cl. 99—340)

This invention relates to improvements in electrical cooking appliances adapted for use as ovens, broilers, toasters, or the like, though various features of the invention are capable of more general application.

In such appliances, it is customary to provide a sheet metal housing or shell defining a substantially completely enclosed cooking compartment having therein an electrical heating element and a tray for supporting the food either above or below the said heating element, depending upon the operative position of housing, as well as insulated supports by means of which the unit may be maintained in operative position on and insulated from a supporting surface.

For the achievement of simplified and economical production of such a unit, it has heretofore been proposed to form the housing thereof of relatively opposed housing halves or sections, including relatively spaced horizontal panels for defining the upper and lower walls of the oven housing, and relatively registering and preferably integral wall portions extending vertically from these panels and interconnected rightly to form the end walls of the housing, while at the same time to interconnect the respective housing sections as a unit. Also, there is customarily provided an opening in the front wall through which a food support such as a tray or sliding drawer may be inserted and operatively supported.

The present invention envisions a new, simplified and efficient mode of interconnecting such sheet metal housing halves or sections with their vertical end wall portions in snug edge-to-edge relation. In accordance with an important aspect of the invention, the means for thus interconnecting these housing sections includes a novel combination of connecting tongues or members formed integrally with the respective end walls, and cooperating connector clips.

A further advantageous feature consists in so forming the said tongues and connector clips that the act of assembling them will function to draw the opposing edges of the housing sections firmly into abutting relation.

Further, there is provided a novel combination with the connector clips of novel spreaders supported by the said clips and cooperating therewith to provide air convection passages communicating with the cooking compartment at locations above and below the food-support tray or partition therein, to provide free communication around the said tray between the upper and lower subcompartments into which the cooking compartment is divided by the said tray.

Also, in accordance with a further feature of the invention, a thermostatic control element such as a thermostatic control switch for selectively energizing and regulating the temperature of the heating element is supported with its thermally-responsive element disposed within the air convection passage thus defined, whereby to respond promptly to variations in temperature of the air passing therethrough, as well as to simplify the assembly of the respective parts.

A particularly important object of the invention is to construct and interrelate the said tongues, connecting hooks, and spreaders that they will mutually interlock and retain each other in securely-assembled relation, without the need for extraneous fastenings such as conventional threaded means, rivets, soldering, or the like.

Also, it is an object of the invention to provide in conjunction with such a housing, insulated supports in which the several components of each support mutually interlock with each other and with the housing to secure each support in assembled condition on the housing.

The foregoing as well as other incidental features and objects will become apparent from consideration of the following detailed description together with the accompanying drawings of the preferred embodiment of the invention in which:

FIGURE 1 is a perspective view of a toaster-broiler unit embodying the invention;

FIGURE 2 is a vertical section along with line 2—2 of FIGURE 1;

FIGURES 3 and 4 respectively are horizontal and vertical sections through the structure of FIGURE 2 on the lines 3—3 and 4—4;

FIGURE 5 is an enlarged detail elevational view of the interconnected portions of the vertical wall sections at one end of the housing, with various parts removed to better illustrate the construction of the connecting means;

FIGURE 6 is a fragmentary section on the line 6—6 of FIGURE 5 illustrating the manner in which the connecting clips cooperate with their associated locking tongues;

FIGURE 7 is a fragmentary and enlarged vertical section on the line 7—7 of FIGURE 6 illustrating the preferred manner in which channel-shaped spreader members are associated with the connector clips and end wall structure to therewith define the air convection passage;

FIGURE 8 is a perspective view of one of the connector clips per se;

FIGURE 9 is an enlarged fragmentary vertical section substantially on the line 9—9 of FIGURE 1 showing details of the cooperation between the support brackets, the support bars or members, and the oven housing;

FIGURE 10 is a perspective view of one of the support brackets per se; and

FIGURE 11 is a side elevation of such a bracket.

To promote an understanding of the invention, reference will now be made to the preferred embodiment thereof illustrated in the accompanying drawings, and specific language will be used to describe the same. It will nevertheless be appreciated that no limitation of the scope of the invention is thereby intended, but that such further modifications and alterations are contemplated as would normally occur to one skilled in the art to which the invention relates.

Referring now in detail to the accompanying drawings, and first considering generally the structure shown in FIGURES 1 through 4 inclusive, the cooking unit there illustrated comprises a generally-enclosed housing 10 of hollow construction defining a normally-enclosed cooking compartment 11. Housing 10 is formed of a pair of vertically opposed housing sections 10a and 10b respectively of identical construction, having generally vertically-directed end wall sections or portions 12 which preferably constitute integral continuations of the relatively-spaced sheet metal horizontal webs or panels 13. Panels 13, in the present instance, interchangeably define the top and/or bottom of the housing 10. At their front and rear edges respectively, each of the sections 10a and 10b of the housing 10 is formed with an edge beading 14 preferably coextensive in length with its horizontal panel 13 and end wall sections or portions 12 respectively. The opening framed by the beadings 14—14 at the rear of the housing is closed by the conformingly-shaped rear wall or panel 15, which may conveniently be clamped between the said beadings 14 by studs 16 at the rear ends of the tray guides or supports 17.

The heating element 18, here shown (in FIGURES 2 and 3) in the form of a usual resistance wire coil, is supported by conventional insulating brackets 19 on a pan 20, in spaced parallel relation to one of the horizontal panels 13 of the housing, shown in FIGURES 1, 2 and 3, as the bottom wall of the housing.

The ends of the heating element 18 are connected in an electrical circuit by means of the usual contact members or prongs 21 which, in turn, are adapted for reception in a conventional electrical socket of an extension cord in known manner.

The heating element pan 20 in the present embodiment is supported in the housing section 10b in spaced parallel relation to the horizontal web 13 thereof as, for instance, by having its rear upstanding wall 20R (FIGURE 4) suitably secured as by riveting 22 to the rear wall 15 of the housing. An upwardly-inclined integral flange 23 along its forward edge is riveted to the reversely-and-downwardly-bent portion 24 of a front wall portion 25 of the housing 10. The housing section 10a is provided with a similar front wall portion 25 having associated therewith a reversely-bent or inclined portion 24. The front wall portions 25 abut against the marginal beadings 14, being held in such relation by integral connecting tabs 26 respectively which are riveted or otherwise secured at 27 flush against the respective end walls of the housing sections 10a and 10b.

As shown in FIGURE 3, the heating coil 18 is connected to the terminals 28 respectively of a combined switch and adjustable thermostat of generally conventional structure, controllable by means of a manually-actuated external knob 29 affixed to the outer end of the rotary switch and thermostat shaft 30.

The front wall segments 25 of the housing are relatively spaced apart to provide an opening for reception of the food-supporting drawer or tray 31, the laterally-opposed horizontal flanges 31a of which are adapted for sliding reception and guidance on either of the laterally-opposed pairs of runners or flanges 17b—17b of the channeled tray guides 17. As is shown in FIGURE 4, each such guide 17 is provided with laterally-offset mounting plate 17a at its opposite ends which preferably span the juncture of its associated end wall sections 12 and it is connected to each, as for instance by the rivets 32, to support the main portion of the rail 17 therebetween in somewhat inwardly-spaced relation from the housing ends.

At the forward end portions of the respective rails 17, the flanges 17a thereof diverge forwardly in vertical planes to the edges of the opening between the front wall sections 25, whereby to guide the drawer or tray into operative position. At its forward edge, the food support or tray 31 is provided with a vertical wall 33 which may include a transparent panel 34 of glass or other suitable material, the drawer 33 being proportioned to occupy and close the space or opening between the front wall segments 25 when the drawer is operatively positioned. If desired, the drawer may removably support a conventional wire grill 36.

The housing 10 in the present embodiment is adapted for alternate operation either in the position shown in the drawings, wherein it rests on the insulated supports 36—36, or in a relatively-inverted position in which it rests on a similar pair of such supports 36—36. In the position illustrated in FIGURE 2 with the housing resting on the supports 36, the heating element 18 is disposed beneath the food-support tray or drawer 31, so that the unit may function as an oven or baker unit. In order to adapt the unit for its alternative function as a toaster or broiler, the tray or drawer 31 is removed and the unit inverted to rest on its other pair of supports 36—36, thereby placing the heating element 18 in the upper portion of the oven compartment, whereby, when the sliding tray or drawer 31 is replaced on the ledges 17b, it will be appreciably beneath the heating element 18.

In addition to its other advantageous features, the invention includes a novel construction of the supports 35 which facilitates the assembly of their several components to each other and to the oven housing. The arrangement is such that the several parts of each of the identical supports 36 interlock with each other and with the housing to mutually position and support each other without the necessity for extraneous fastening or securing devices.

In view of identical structure of the several supports, it will suffice to provide a detailed description of but a single such device or support 36 which, as is best illustrated in FIGURES 9, 10 and 11, in conjunction with FIGURES 1 and 2, comprises a pair of relatively-spaced supporting sheet metal brackets 38 projecting outwardly from and generally normally to one of the horizontal webs 13 of the housing. Supported between the brackets at their outer ends is a spreader member 39 having sockets 40 at its opposite ends in which are received the endwise projecting detents 41 of the respective brackets. At their inner extremities, the rectilinear edges 43 of the respective brackets 38 abut against the surface of the housing horizontal web 10 and are provided with relatively-spaced anchoring lugs 42 which extend inwardly from the said edges 43 of their respective brackets 38 for reception through appropriately-positioned slots 44 in the housing.

In assembling such a support to the housing, each of the two brackets 38 thereof will be positioned in a near parallel relation to the web 10 to which it is to be connected, while its anchoring lugs 42 are inserted through the slots 44 thereof. When the tongues or lugs 42 are thus fully inserted, the lower edge 43 of the bracket will abut against the surface of the web to provide a fulcrum about which the bracket is pivoted to swing the lugs into abutting and generally parallel relation with the inner face of the web 10. With the two brackets 38 thus positioned, their free outer ends are forced apart sufficiently to permit insertion of their detents 41 into the end sockets 40 of the spreader 39. It will be readily appreciated that the sheet metal material of which the brackets and housing are formed in the preferred embodiment, will permit sufficient resilient yielding or flexibility for this purpose and will result in securing the parts in securely and firmly assembled relation, it being apparent that the length of the member 39 will be such as to maintain a slight degree of spreading force against the free ends of the brackets 38 so as to be firmly secured thereby and to maintain the brackets with their anchoring lugs 42 at all times in firm engagement with the inner surface of the web 10.

An even more important feature of the invention consists in the particular structure which forms a primary means for interconnecting the two housing sections 10a and 10b with their end walls in edge-to-edge abutment, as well as for achieving other highly-advantageous functions.

Thus, referring to FIGURE 5, it will be apparent that the end wall portions or housing ends 12 at either end of the housing have rectilinear horizontal edges 12e in relatively-abutting relation, preferably in the horizontal plane of symmetry of the preferred form of housing. The respective wall segments jointly define a preferably rectangular opening 45 extending across and bisected by the plane of symmetry of the edges 12e. From the horiztontally-opposed ends of the opening 45, pairs of relatively contiguous connector tongues 46—46 engage each other in abutting relation among the edge 12e. From the free inner ends thereof, the relatively-remote edges 46a—46a of each pair of tongues diverge relatively outwardly to its juncture with the end edge 45e of the opening 45, it being noted that such edge portions 45e are disposed on opposite sides of each pair of tongues.

Each pair of tongues 46 is firmly secured in edge-to-edge relation by means of a connector clip 47, such as is shown in perspective in FIGURE 8. Referring to FIGURES 5 and 6 in conjunction with FIGURE 8, it will be apparent that each clip 47 comprises a generally-flat base plate 48 which extends across the abutting edges 12e in flush engagement with the wall portions 12 on opposite sides of said edges. This plate 48 has relatively vertically-spaced hooks 49—49, here-shown as reversely-bent extensions of the plate 48. These are parallel to the plate 48 and spaced therefrom a distance substantially equal to the thickness of the sheet metal forming the wall portions 12, for reception between each hook 49 and the wall portion 12 of one of the relatively-spaced end edge portions 45e of the interconnected wall portions 12—12 on opposite sides of the pair of tongues 46 of said end. The closed ends 50 of the respective hooks 49 are adapted for abutting engagement with the end edges 45e and are spaced apart a distance substantially equal to the maximum combined width of the pair of tongues 46a at their outer or base ends, whereby the vertically-opposed edge portions 51 (FIGURE 8) of the respective closed ends 50 will coact with the inclined cam edges 46a of the respective tongues to urge the edges 12e together during application of the clip to the tongues, while the hook portions 49, in conjunction with the plate 48, maintain the tongues in edge-to-edge registry.

It will be noted that due to the relatively reversely-directed disposition of the pairs of tongues 46, their respective connector clips 47 will be applied or moved onto the tongues in opposite lateral directions.

For the purpose of maintaining the connector clips 47—47 in their relatively spread-apart operative positions in wedging engagement with the relatively-remote inclined edges 46a of the pairs of tongues 46, there is provided in combination with each pair of clips 47—47 a rigid spreader 52, in the form of a sheet metal channel member. The spreader 52 is supported between and in endwise engagement with respective clips, preferably by means of the abutment plates 53 which are here shown as integral outwardly-bent portions of the base or main plates 48 of the respective clips extending perpendicularly thereto in vertical planes.

For so positioning the spreader 52, the respective clips 47 are each provided with oppositely-projecting pairs of mounting detents or tongues 54 spaced somewhat outwardly from the end wall 12 for reception of the inwardly-directed edges of the horizontal flanges 56 of the spreader 52. It is to be understood that the channel-shaped spreader 52 is of a sheet metal or other suitable material having sufficient flexibility that in order to apply or remove the spreader, the horizontal flanges 55 thereof may be flexed about their connections to their common vertical wall or plate 57 of the spreader to spread apart the opposed inner edges of the flanges or ledges 55.

From the foregoing, it will be apparent that the housing wall portions 12, the clips 47—47, and spreader 52 mutually interlock with each other to secure the clips 47 operatively positioned on the connector tongues 46—46 while at the same time securing the spreader 52 between them. Moreover, the spreader 52, in conjunction with the connector clip abutment plates 53, defines a housing which is completely enclosed on all sides except over the opening 45, through which opening it communicates with the cooking compartment 11. The vertical extent of each tray or drawer guide 17 is somewhat less than that of the openings 45, and the upper and lower extremities of each guide are spaced inwardly from the horizontal edges of the opening, so that the interior of the channel-shaped spreader 52 communicates with the cooking compartment 11 at locations both above and below the tray or drawer 31, and thus define an air convection flow passage 58 between the upper and lower portions or sub-compartments of the cooking compartment 11 above and below the food support 31.

Because of the flow of heated air therethrough, such a passage 58 is ideally situated to house the thermally-responsive portion, generally designated 59, of the thermally-responsive control and switch 28. Thus, as shown in FIGURE 2, such thermally-responsive portion 59 of the switch thermostat is supported within the passage 58 at one end of the unit, being mounted preferably on the adjacent guide 17, with its rotary shaft projecting outwardly and freely rotatable through an opening 60 (FIGURE 2) in the spreader 52, to support the conventional manually-actuated control knob 29 externally of the passage.

By use of the foregoing features, the production and assembly of a cooking unit in accordance with the invention is greatly simplified. The two housing sections 10a and 10b may be formed of sheet metal or other suitable sheet material, as identical members or components, either of which is adapted to receive and support the heating element 18 of its tray 20. The particular manner of assembling the various conventional components is not critical and may be varied in obvious ways.

In order to assemble the housing sections 10a and 10b with each other and with the associated connector clips 47 and spreaders 52, the housing sections are positioned with their end wall sections 13 in edge-to-edge relation as shown in FIGURES 1 and 2, whereupon the clips 47 are inserted over the tongues 46 in the opposite ends of each opening 45 and urged apart into operative relation. The hooks or reversely-bent portions 49 in conjunction with the main or base plates 48 of the respective clips position the wall sections with their edges 12e aligned for abutment, and the opposed edges 51—51 of the closed ends or bights of the hooks of each clip wedgingly engage the inclined edges 46a of the pairs of tongues to urge the said edges 12e into firm abutting engagement. The subsequent positioning of the spreaders 52 on the clips and in abutting endwise engagement with their respective abutment plates 53, serves not only to secure the clips themselves in operative position, but also enable same to provide supports for the spreaders 52. The automatic interlocking of the spreader ledges 55 with the detents 54 of the clips, secures the several parts in assembled relation in such manner as to provide a completely-enclosed housing for each opening 45 through the end walls of the compartment and thereby prevents heat losses through said openings. In addition, the enclosures 58 thus defined form air convection passages between the upper and lower portions of the cooking compartment and around the food support 31 in said compartment, while also providing a convenient housing for the thermostat out of the cooking compartment 11, but at the same time in position for exposure to the temperature prevailing therein.

The manner of assembly of the respective supports 36 to the housing has heretofore been described in detail. It is readily apparent that as to both the supports 36 and the assemblage of the clips 47, locking tongues 46, and spreaders 58, the several parts in each instance are so related as to automatically interlock and maintain the parts in assembled relation without the need for extraneous connectors or fasteners and yet may readily be disassembled when necessary to permit repairs or cleaning.

Having thus described my invention, I claim:

1. In a cooking unit, a housing comprising a pair of relatively-opposed housing sections having sheet metal wall portions interconnected in edge-to-edge relation to define a normally enclosed cooking compartment, said interconnected wall portions respectively being formed with complemental portions of a generally rectangular opening extending on opposite sides of the abutting edges of said housing sections, relatively-opposed pairs of connecting tongues having free ends projecting toward each other from the respective wall portions at opposite lateral ends of the opening with the adjoining edges of the tongues of each pair coincident with the said respective edges, said tongues of each pair respectively having remotely-presented inclined edges converging toward said free ends of the tongues, and connector clips respectively associated with said pairs of tongues, each clip comprising a base plate extending across said abutting edges at the bases of the respective pairs of tongues and having hooks extending around the end edges of said opening on opposite sides of each pair of tongues, said hooks and plates respectively clamping the said wall portions between them with adjoining edges thereof in registry, said hooks having bight portions extending around said end edges of the opening on opposite sides of the respective pairs of tongues and in wedging engagement with the relatively remote inclined edges of said tongues of each pair.

2. The combination of elements defined in claim 1, further including means connected to the said clips for maintaining them in relatively-spaced relation.

3. The combination as defined in claim 2, in which each said clip includes an abutment plate rigidly connected to and projecting outwardly from and generally perpendicularly to its said base plate, said means connected to the clips comprises a rigid spreader supported between and abutting against the respective said abutment plates to maintain the laterally-spaced relation of said clips with their hooks in wedging engagement with their respective pairs of tongues.

4. The combination of elements defined in claim 3, in which said spreader and said clips respectively comprise interlocking members for supporting the said spreader on the clips between and in abutting relation with said abutment plates.

5. The combination of elements defined in claim 3, in which said spreader comprises a channel member, including a wall extending between said abutment plates over said opening and in spaced parallel relation to said interconnected wall portions and upper and lower horizontal end flanges extending inwardly from the upper and lower edges of said vertical wall to their respective wall portions whereby to define an enclosure over said opening.

6. The combination of elements defined in claim 5, in which said clips include mounting detents projecting in opposite directions therefrom, and said spreader includes mounting ledges projecting inwardly from the free edges of the respective flanges thereof, said channel member being of stiffly resiliently-flexible sheet material, whereby said free edges and mounting ledges of the flanges may be forced apart for reception therebetween of the said mounting detents to thereafter resiliently interlock with same.

7. In combination with the subject matter of claim 5, a food tray supported in said cooking compartment and extending generally horizontally between said openings in the interconnected wall portions thereof, with the opposite end edges of said tray disposed medially of the height of the respective openings, whereby said openings communicate with the cooking compartment above and below said tray and said openings, clips, and spreaders define air passages establishing communication between the upper and lower portions of said compartment around said tray.

8. A cooking unit as defined in claim 7, further including guides carried by said interconnected wall portions medially of the height of the respective openings therethrough and slidably supporting said tray, said guides cooperating with the opposite edges of said openings to define ports through which said air passages defined by the channel members and clips communicates with the cooking compartment both above and below the tray.

9. The combination defined in claim 7, including an electrical heating element within said cooking compartment on one side of said tray whereby convection air currents arising from the action of said heating coil may pass around said tray between the upper and lower portions of said cooking compartment through the said convection air passages.

10. The combination defined in claim 9, including a thermostatic temperature control for said heating element, said control having a thermo-responsive portion disposed in said convection air passage.

11. A cooking unit comprising a housing which includes a pair of relatively-opposed housing sections having wall portions interconnected along a plane of symmetry to define a cooking compartment; said housing sections respectively comprising relatively-spaced horizontal webs, and said interconnected wall portions extending in vertically opposed pairs from the respective said webs, the wall portions of each said vertically opposed pair being connected to each other in edgewise abutment in said plane of symmetry to define end walls for said housing, the wall portions of each said pair being formed with an opening extending across said plane of symmetry, pairs of connector tongues projecting from opposed ends of said opening toward each other, with the tongues of each pair in edgewise abutment along said plane of symmetry and respectively having remotely-presented inclined edges converging toward their free ends, connector clips respectively associated with said pairs of tongues, each said clip comprising a flat base plate for disposition across said plane of symmetry in snug sliding abutment with the wall portions on opposite sides thereof, relatively-spaced hooks projecting from one edge of said base plate and received in said opening on opposite sides of said pair of tongues, said hooks extending around the edges of said opening in abutting engagement with the inner faces of the said wall portions, said hooks respectively having bights disposed in wedging engagement with the said relatively-remote inclined edges of said tongues, and spreader means between the respective clips and in endwise abutment therewith for maintaining same in laterally-spread-apart operative positions.

12. A cooking unit as defined in claim 11, in which each said clip includes an abutment plate rigidly connected to and projecting outwardly therefrom perpendicularly to its said base plate, said spreader means being supported between and in endwise abutment with the said abutment plates, said spreader means comprising a channel member including a vertical wall extending between said abutment plates over said opening and in spaced parallel relation to said end wall portions, upper and lower stiffly-flexible horizontal flanges extending inwardly from the upper and lower edges of said vertical wall to the said end wall portions and having inwardly-directed fastener ledges at their free inner edges, said mounting plates being provided with detents for interlocking engagement with the said fastener ledges.

13. The combination of claim 11, including a horizontal tray guide secured to one of said end walls, said opening extending above and below said tray guide, a tray having one edge supported by said guide, said tray subdividing the said compartment horizontally into upper and lower sub-compartments, said spreaders and abutment plates cooperating with said opening to define air convection passages around the said tray and said guide between the said sub-compartments.

14. The combination of claim 13, further including a thermostatic switch element having its thermally-sensitive portion disposed in said air convection passage.

15. In a cooking unit comprising a sheet metal enclosed cooking compartment having one wall thereof defined by a substantially-flat sheet metal web, relatively-spaced parallel slots formed in said web, supports for said unit comprising a pair of sheet metal brackets in edgewise abutment with said web in planes normal thereto and coincident with the respective slots, said brackets respectively including anchoring lugs projecting inwardly through said slots and in parallel flush abutting engagement with the inner face of said web, and insulated supports connected between and spreading apart the outer ends of the respective brackets.

16. The combination defined in claim 15, further including relatively oppositely-directed sockets in the opposite ends of said insulated supports, and lugs at the outer ends of the brackets for reception in said sockets.

References Cited by the Examiner
UNITED STATES PATENTS

| | | |
|---|---|---|
| 1,959,198 | 5/1934 | Conry. |
| 1,974,360 | 9/1934 | Kimmel. |
| 2,013,136 | 9/1935 | Cornelius. |
| 2,231,830 | 2/1941 | Moore et al. _____ 16—114 X |
| 2,474,532 | 6/1949 | Kitchen. |
| 3,159,094 | 12/1964 | Crease et al. _____ 99—340 |
| 3,187,859 | 6/1965 | Maziarka _____ 16—114 X |

B. J. WILHITE, *Primary Examiner.*